United States Patent [19]
Goldman et al.

[11] Patent Number: 5,644,738
[45] Date of Patent: Jul. 1, 1997

[54] SYSTEM AND METHOD USING CONTEXT IDENTIFIERS FOR MENU CUSTOMIZATION IN A WINDOW

[75] Inventors: Jason D. Goldman; William G. McCollom; Evelyn Williams, all of Fort Collins, Colo.

[73] Assignee: Hewlett-Packard Company, Palo Alto, Calif.

[21] Appl. No.: 527,478

[22] Filed: Sep. 13, 1995

[51] Int. Cl.$^6$ ......................................................... G06F 3/00
[52] U.S. Cl. .......................... 395/352; 395/343; 395/333
[58] Field of Search ..................................... 395/155, 156, 395/157, 343, 352, 333

[56] References Cited

U.S. PATENT DOCUMENTS

| | | | |
|---|---|---|---|
| 4,586,035 | 4/1986 | Baker et al. | 340/712 |
| 5,297,250 | 3/1994 | Leroy et al. | 395/157 |
| 5,321,841 | 6/1994 | East et al. | 395/725 |

*Primary Examiner*—Raymond J. Bayerl
*Assistant Examiner*—A. Katbob

[57] ABSTRACT

A context identification system is implemented in a window manager to optimize association of menu items with windows. The context identification system has an application registration mechanism, a window creation mechanism, and a menu item placement mechanism. The application registration mechanism creates menu items to be placed in windows for display. Each menu item comprises a context expression, a predefined function specification defining an action to be taken by the window manager when the menu item is prompted, and a menu string defining a display image corresponding to the menu item. The window creation mechanism defines windows for display. A context list of context identifiers is maintained by the window creation mechanism for each window. Finally, the menu item placement mechanism determines which menu items are to be placed in each window based upon an evaluation of a context expression associated with each menu item and the context list of context identifiers associated with each window.

20 Claims, 4 Drawing Sheets

SYSTEM AND METHOD USING CONTEXT IDENTIFIERS FOR MENU CUSTOMIZATION IN A WINDOW

FIELD OF THE INVENTION

The present invention generally relates to window management software for computer systems, and more particularly, to a system and method using context identifiers for menu customization in windows to facilitate integration of application programs behind windows and to optimize association of menu items with windows.

BACKGROUND OF THE INVENTION

A graphical user interface (GUI) that produces and drives windows on a display typically includes a window manager. The window manager is a software program or module that defines the parameters of windows and generates the windows. Additionally, the window manager acts as a go-between for user interaction with application program windows, including menu item selection. Moreover, the window manager maintains a list of menu items that are to appear in each window. The list of menu items may be maintained in a resource file managed by the window manager. The menu items make certain functions or activities available to the user. The selection of a menu item residing within a window by the user causes the window manager to prompt a particular function or activity, including operation of a particular application program.

Generally, it is desirable to integrate together windows-based application programs. If the application programs are integrated and work together, then the user is more productive and the application programs themselves become part of a bigger, more flexible, and more powerful system.

Historically, menu items have been associated with windows using either a point-to-point technique or a broadcast technique. In the point-to-point technique, which is employed by Microsoft Windows® that is commercially available from Microsoft Corporation, U.S.A., as an example, menu items are defined in resource files, and each window is programmed to read in a specific resource file. A disadvantage of this technique is that menu items are not related to windows in a generalized way so that menu items may be selectively targeted to groups of windows, such as a window that has not yet been created by an application program. Along these lines, the reciprocal case of an application program's window being able to add menu items from a new unknown source is also very difficult. Thus, integration of windows-based application programs is hampered.

More specifically, consider an application program that creates menu items which provide configuration management (CM) functionality. These menu items should appear in edit windows. The CM developer would like these menu items to appear in all windows used for editing tasks. Later, another program, a graphical editor, is developed for drawing diagrams. The CM menu items would be very useful within this graphical editor as well but, because the CM application program does not know about graphical editors, the items are not added. Unless one of the two programs knows about the other in order to provide a point-to-point connection, they cannot work together this way. Ideally, the CM tools should be able to refer to the same attribute of the window that would be valid for both text editors and graphical editors.

The broadcast technique distributes new menu items to all resident windows. As an example, the broadcast technique is employed by SoftBench®, which is a collection of computer programs used for software development that is commercially available from Hewlett-Packard Company, U.S.A. However, this technique is undesirable in that it dilutes the functionality of a particular window, degrades user productivity and performance, and unnecessarily increases memory requirements. Once again, integration is also hampered.

A heretofore unaddressed need exists in the industry for providing a system and method for relating menu items to windows in a more optimal generalized manner so that menu items may be selectively targeted to groups of windows, even if an application program creating such a target window does not exist yet, and so that an application program's window is able to add menu items from a new unknown source.

SUMMARY OF THE INVENTION

The present invention overcomes the inadequacies and deficiencies of the prior art as discussed hereinbefore. The present invention provides for a context identification system and method that can be employed within a window manager of a software program. The context identification system and method facilitate integration of application programs behind windows and provide for optimum association of menu items with windows in order to achieve higher performance and greater flexibility as compared to prior art techniques.

The context identification system and method utilize context identifiers. In essence, a context identifier describes an aspect of how a window is used. A list of context identifiers is associated with each window. The context identifiers corresponding to each window collectively define the attributes that determine which menu items should be present within that window. While a window defines valid context identifiers for that window, a menu item is tagged with a context identifier expression, which is preferably a Boolean equation (i.e., terms connected by logical operators, e.g., AND, OR, etc.) whose terms reference context identifiers. This expression defines which windows the menu items should be associated with and placed within. Significantly, this context identifier expression can be used to target disjoint sets of windows.

In architecture, the context identification system includes an application registration mechanism configured to create a menu item to be placed in a window for display. The menu item comprises at least the following: a context expression, a predefined function specification defining an action to be taken by the window manager when the menu item is selected, and a menu string defining a display image corresponding to the menu item. A window creation mechanism associated with the context identification system defines windows for display and maintains a context list of context identifiers for each of the windows. The context identification system includes a menu item placement mechanism that is configured to match menu items with particular windows based upon an evaluation of the context expression associated with each menu item and the context list associated with each window. Finally, a menu item dispatch mechanism associated with the system is configured to relate a menu item selection by a user with a predefined function specification.

The context identification method can be broadly generalized as follows: associating a context expression with a menu item for prompting an action; associating one or more context identifiers, preferably a list, with a window for display; and determining if the menu item is to be placed in the window based upon an evaluation of the context expression and the one or more context identifiers.

In accordance with another feature of the present invention, the context expression may include a term (herein, "AllContexts") that indicates that the menu item should be placed in all windows, making this a generic menu item. This feature further simplifies and optimizes the novel context identification system and method of the present invention.

Another feature of the present invention is that the context list associated with a window may include a context identifier (herein, "NoGeneric") that indicates that no generic menu items are to be placed in the window, while further delineating other menu items. This feature further simplifies and enhances the novel context identification system and method of the present invention and prevents dilution of functionality in a window.

The context identification system and method of the present invention have many advantages, a few of which are delineated hereafter, as examples.

An advantage of the context identification system and method of the present invention is that they provide a general scheme for relating menu items to windows so that menu items may be selectively targeted to groups of windows. The generalized scheme does not rely on a point-to-point relationship, and in fact, the generalized scheme is more open-ended in its support for defining this relationship. This generalized approach allows a menu item to be placed in a window that was nonexistent when the menu item was defined as long as the new window's context satisfies the menu item's context expression.

Another advantage of the context identification system and method of the present invention is that they provide for a more flexible and user friendly scheme for associating menu items with windows as compared to the point-to-point technique or the broadcast technique.

Another advantage of the context identification system and method of the present invention is that they provide for greater flexibility, higher performance, and reduced requisite memory as compared to the broadcast technique.

Another advantage of the context identification system and method of the present invention is that they provide for a scheme for associating menu items with windows that is simple in design, reliable, and efficient.

Another advantage of the context identification system and method of the present invention is that they can be employed in virtually any windows-based GUI.

Other features and advantages of the present invention will become apparent to one with skill in the art upon examination of the following drawings and detailed description. It is intended that all such additional features and advantages be included herein within the scope of the present invention, as is defined by the claims.

BRIEF DESCRIPTION OF THE DRAWINGS

The present invention can be better understood with reference to the following drawings. The elements of the drawings are not necessarily to scale, emphasis instead being placed upon clearly illustrating principles of the present invention. Furthermore, like reference numerals designate corresponding parts throughout the several views.

DETAILED DESCRIPTION OF THE PREFERRED EMBODIMENT

The context identification system 10 can be stored on any computer-readable medium for use by or in connection with a computer-related system or method. In the context of this document, a computer-readable medium is an electronic, magnetic, optical, or other physical device or means that can contain or store a computer program for use by or in connection with a computer-related system or method.

Figure 1:
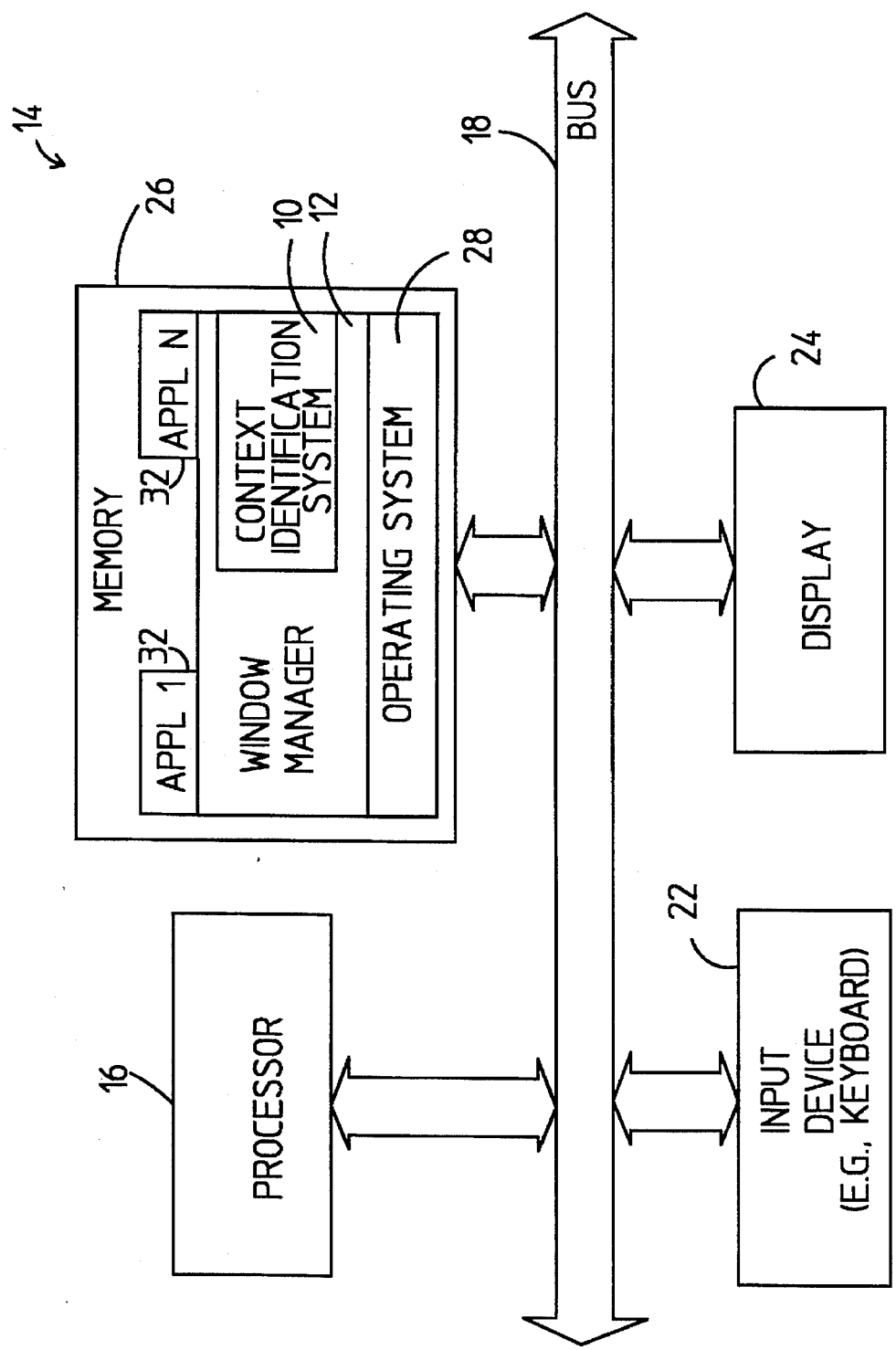
FIG. 1 is a block diagram illustrating the context identification system and method of the present invention situated within a computer-readable medium, for example, in a computer system.
Figure 3:
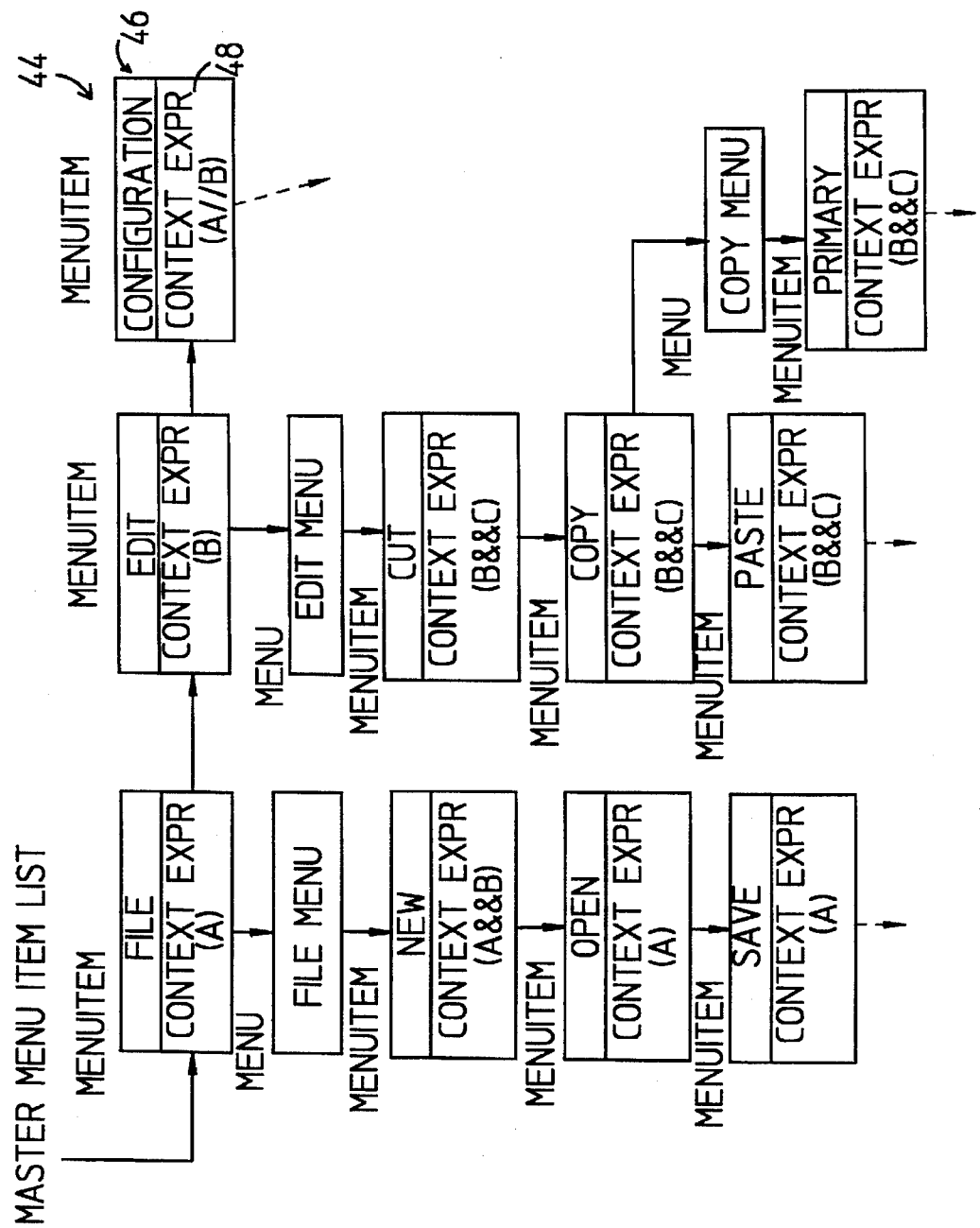
FIG. 3 is a block diagram illustrating an example of a hierarchical menu list of menu items (e.g., file, configuration, cut, etc.) with associated context expressions (e.g., A; A||B; B&&C; etc.) that is maintained by and operated upon by the window manager of FIGS. 1 and 2 in order to populate windows with menu items.
Figure 4:
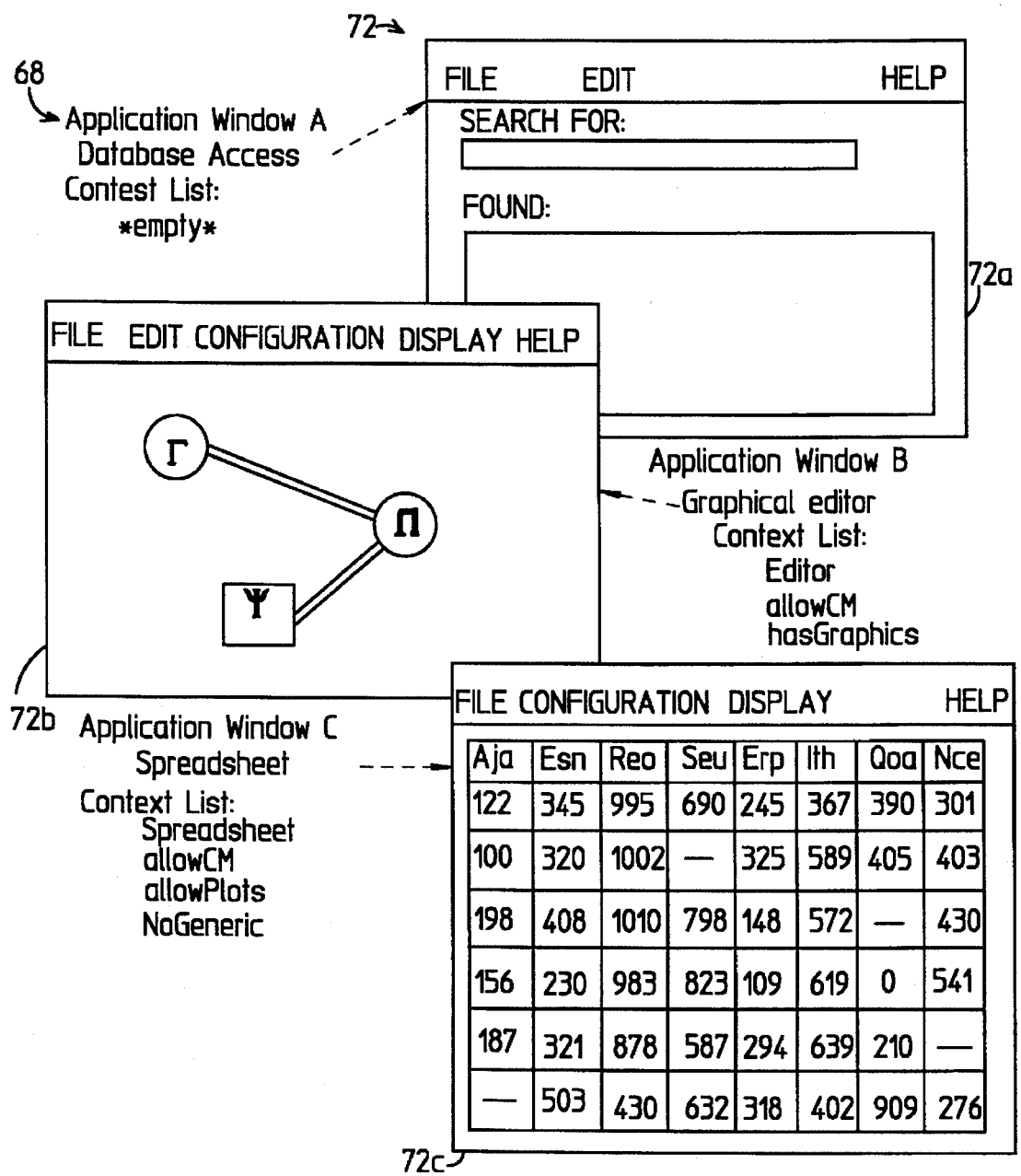
FIG. 4 is a graphic diagram illustrating an example of a window hierarchy wherein each window in the hierarchy has a corresponding context list in accordance with the context identification system and method of the present invention.

As illustrated by way of example in FIG. 1, the context identification system 10 of the present invention along with its associated methodology can be employed in connection with a window manager 12 that is run within a computer system 14 for the purpose of improving association of menu items 46 (FIG. 3) with windows 72 (FIG. 4). The computer system 14 comprises a conventional processor 16 that communicates to other elements within the computer system 14 via a bus network 18. An input device 22, for example, a keyboard or mouse, is used to input data from a user of the system 14, and a screen display 24 is used to output data to the user. A memory 26 within the computer system 14 stores the context identification system 10. The context identification system 10 is preferably implemented as part of the window manager 12, which communicates with a conventional operating system 28 to generate windows 72 on the display 24 based upon application programs 32 that are conceptually operable over the window manager 12 and based upon inputs from the user via the input device 22. As is well known in the art, the computer programs 32, 10, 12, 28 (in decreasing hierarchical arrangement) that are stored in the memory 26 configure and drive the processor 16 as well as the computer system 14 so that a desired windows-based interface with the user is achieved via input device 22 and display 24.

The context identification system 10 of the present invention employs a novel menu customization technique. When a window 72 is created, the window's application program developer sets its context. The window context is made up of a context list of context identifiers. Moreover, when a menu or menu item 46 is created, the menu item's application program developer defines a context expression 48 (FIG. 3). The context expression 48 is a way to specify windows 72 within which the menu items 46 should be placed. When a window 72 is opened, the full list of possible menu items 46 is checked. If a menu item's context expression 48 evaluates as true for a given window's context, then the menu item 46 is added to the window's menus. The context expression 48 may reference context identifiers in a limited Boolean expression or may specify that the menu item 46 is generic and should be placed in all window menus. Furthermore, windows 72 in the context identification system 10 may be created which do not add generic menu items 46.

Figure 2:
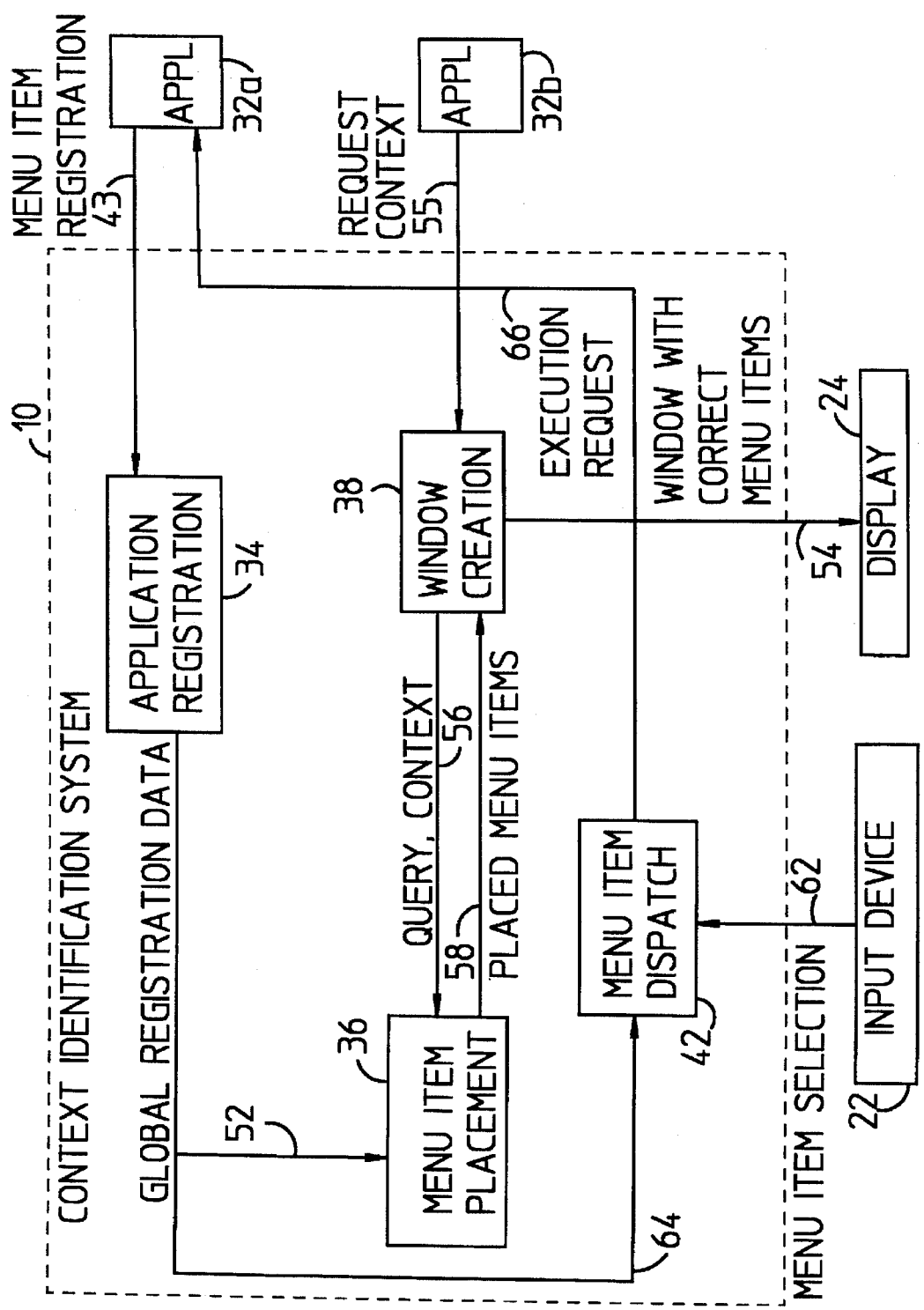
FIG. 2 is a block diagram illustrating the architecture and functionality of the context identification system of FIG. 1.

The architecture of the context identification system 10 is illustrated in more detail in FIG. 2. As shown in FIG. 2, the context identification system 10 generally comprises an application registration mechanism 34, a menu item placement mechanism 36, a window creation mechanism 38, and a menu item dispatch mechanism 42. The application registration mechanism 34 specifies and creates menu items 46 (FIG. 3) to be placed in a window 72 (FIG. 4) for display. A menu item specification generated by the application registration mechanism 34 includes at least the following data: (a) a context expression 48 that is used to relate the menu item 46 to a group of window types; (b) a function specification indicating what the menu item 46 should accomplish if selected; and (c) a menu label string that defines a display image for display.

The application registration mechanism 34 receives menu items 46 from application programs 32, as indicated by reference arrow 43. The application registration mechanism 34 maintains a menu item list 44 of the menu items 46 that are arranged hierarchically, as illustrated by way of example in FIG. 3. Specifically, in this example, a master menu item list that defines menu items 46 to appear in a master menu includes the following menu items 46: file, edit, and configuration. The file menu item points to a file menu that contains the following menu items 46: new, open, save, etc. The edit menu item points to an edit menu that contains the following menu items 46: cut, copy, paste, etc. The copy menu item points to a copy menu that has the following menu items 46: primary, etc.

Moreover, each menu item 46 has a context expression 48. In the preferred embodiment, the context expression 48 is defined by terms, parenthesis, logical AND operators (&&), and logical OR operators (||). For instance, as shown in FIG. 3, the menu item 46 denoted "configuration" in the master menu item list has a context expression "A||B" (i.e., A or B), where A and B are context identifiers.

In accordance with another important feature of the present invention, the context expression 48 may include a term "AllContexts" that indicates that the menu items should be placed in all windows. This feature further simplifies and optimizes the novel context identification system 10 of the present invention.

A context expression 48 is evaluated as follows. If a context expression 48 evaluates as true in relation to a window's context, then the menu item 46 is added to that window 72. Terms in the context expression 48 are evaluated relative to the window's context. A term is true if that context identifier name is included in the window context, otherwise it is false. The Boolean expression is evaluated based on the foregoing and the result is returned. If the term is "AllContexts", the term is true if "NoGeneric" is not present in the window's context.

"NoGeneric" is basically a context identifier that may be associated with the context list of a window 72 to indicate that no generic menu items are to be placed in the window 72. This feature further simplifies and enhances the novel context identification system 10 of the present invention and prevents dilution of functionality in a window.

Each of the menu items 46 and context expressions 48 are provided to the application registration mechanism 34 by an application program 32. The application registration mechanism 34 introduces the menu item 46 into the hierarchical structure as shown in FIG. 3 and maintains the list as a reference table.

Referring back to FIG. 2, the menu item placement mechanism 36 receives global registration data 52 from the application registration mechanism 34 and determines whether a menu item 46 is appropriate for a particular window 72. A menu item placement mechanism 36 associates a menu item 46 with a window 72 based upon an evaluation of the context expression 48 associated with the menu item 46 and a context list of context identifiers associated with the window 72.

A window creation mechanism 38 defines windows 72 for driving to the display 24, as indicated by reference arrow 54 and maintains the context list of context identifiers for each window 72. Windows are well known in the art, and examples of windows 72 are illustrated in FIG. 4. Specifically, FIG. 4 shows a database access window 72a, a graphical editor window 72b, and a spreadsheet window 72c. Furthermore, the context identifiers for each window 72 are provided to the window creation mechanism 38 from an application program 32, as indicated in FIG. 2 by application program 32b and reference arrow 55.

When a window 72 is created by the window creation mechanism 38, the window creation mechanism 38 provides a query 56 to the menu item placement mechanism 36. The query 56 prompts the menu item placement mechanism 36 to determine which menu items 46 are to be placed in the particular window 72, based upon the context list of the particular window 72 and the context expression 48 associated with each menu item 46. As indicated by reference arrow 58, the menu item placement mechanism 36 provides the appropriate menu items 46 to the window creation mechanism 34 so that the appropriate menu items 46 can be placed within the particular window 72.

The menu item dispatch mechanism 42 is prompted by the input device 22, as indicated by reference arrow 62, when the user wishes to initiate an action or activity defined by a menu item 46. The menu item dispatch mechanism 42 receives the menu item specification from the application registration mechanism 34, as denoted by reference arrow 64. The menu item specification defines which application program 32 to contact when the menu item 46 is selected by the user. Accordingly, after a user prompt, the menu item dispatch mechanism 42 contacts the appropriate application program 32 and requests execution of the program or routine corresponding with the menu item 46, as is indicated by reference arrow 66.

OPERATION

The preferred operation and sequence of events corresponding with the context identification system 10 and associated methodology are described hereafter.

When an application program 32 is added to the computer system 14 (FIG. 1), the application program 32 registers its menu items 46 (FIG. 3) with the application registration mechanism 34 of the context identification system 10. The foregoing is indicated in FIG. 2 relative to the application program 32a and reference arrow 43. Specifically, the application program 32 provides the menu item specification to the application registration mechanism 34. In turn, the application registration mechanism 34 introduces the menu item specification into the hierarchical menu item list 44 (FIG. 3). Further, the application program 32 provides a context list of context identifiers to the window creation mechanism 38 corresponding with each window 72 of the application program 32, as indicated by reference arrow 55 in FIG. 2.

When an application program 32 prompts the window creation mechanism 38 to create a particular window 72 on the display 24, the application program 32 supplies a context list to the window creation mechanism 38, which in turn provides the context list to the menu item placement mechanism 36, as indicated by reference numeral 56 in FIG. 2. Further, the menu item placement mechanism 36 compares the context list with the context expressions 48 of the menu item list 44 (FIG. 3) and determines which menu items 46 should be placed within the particular window 72. The selected menu items 46 are provided to the window creation mechanism 38 by the menu item placement mechanism 36, as is indicated by the reference arrow 58. After the window creation mechanism 38 receives the menu items 46, it creates the window 72 including the menu items 46 and drives the window 72 to the display 24, as indicated by the reference arrow 54.

An example showing how the window creation mechanism 38 matches menu items 46 with windows 72 is illustrated in FIG. 4 and is described in more detail hereafter.

EXAMPLE

I. Windows

Suppose the following windows:
window A
   context={ }(empty context list)
The application program that generates window A only wants to have generic menu items added.
window B
   context={Editor, allowCm, hasGraphics}
This window might be produced by a graphical editor application program.
window C
   context={Spreadsheet, allowCM, allowPlots, NoGeneric}
The foregoing window might be generated by a spreadsheet application program.

II. Menu Items

Suppose the following menu items:
"Edit—>Cut To Clipboard"
   context expression=(All Contexts)
The creator of this application program wants this menu item to appear everywhere. This application program is providing clipboard access.
"Configuration—>Check In File"
   context express=(allowCM)
This application program is providing configuration management and wants to be placed in any window that wants to allow configuration management functions.
"Display—>Analyze Data"
   context expression=(allowStatAnal||Spreadsheet)
This application program is providing statistical analysis functionality. It wants the menu placed in any window that allows statistical analysis functionality or any spreadsheet window.
"Display—>Data Plot"
   context expression=(Editor&&hasGraphics)||allowPlots)
This application program is providing the ability to graphically plot. It wants the menu placed in any window that allows plotting or any graphical editor window.

III. Results

When the windows are opened, the menu items will be allocated to the windows as follows:
window A:
   "Edit—>Cut to Clipboard", because generic items are allowed.

window B:
   "Edit—>Cut to Clipboard", because generic items are allowed.
   "Configuration—>Check In File", because CM functions are requested.
   "Display—>Data Plot", because this is a graphical editor.
window C:
   "Configuration—>Check In File", because CM functions are requested.
   "Display—>Analyze Data", because this is a spreadsheet.
   "Display—>Data Plot", because plotting functions are requested.

Finally, relative to operation, when the user selects a menu item display in the window 72 via the input device 22, a prompt is forwarded to the menu item dispatch mechanism 42, as indicated by the reference arrow 62. In turn, the menu item dispatch mechanism 42 retrieves the menu item specification corresponding with the selected menu item 46 from the application registration mechanism 34, as is indicated by the reference arrow 64. Further, the menu item dispatch mechanism 42 contacts the appropriate application program 32, based upon the function specification within the menu item specification, as indicated by the reference arrow 66 and requests execution. Accordingly, the application program 32 then runs the program or routine corresponding with the particular menu item 46 that has been selected by the user.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims. Further, in the claims hereafter, the corresponding structures, materials, acts, and equivalents of all means or step plus function elements are intended to include any structure, material, or acts for performing the functions in combination with other claimed elements as specifically claimed.

Wherefore, the following is claimed:

1. A context identification system for a window manager for improving association of menu items with windows, comprising:
   an application registration mechanism configured to create a menu item to be placed in a window for display, said menu item comprising a context expression, a predefined function specification defining an action to be taken by said window manager when said menu item is prompted, and a menu string defining a display image corresponding to said menu item;
   a window creation mechanism configured to define said window for display, said window having a context identifier; and
   a menu item placement mechanism configured to associate said menu item with said window based upon an evaluation of said context expression associated with said menu item and said context identifier associated with said window.

2. The system of claim 1, wherein said context expression is a boolean equation having terms that are context identifiers.

3. The system of claim 1, wherein said context expression includes a means for indicating that said menu item is generic and to be placed in all of said windows.

4. The system of claim 1, wherein said context identifier indicates that no generic menu items are to be placed in said window.

5. The system of claim 1, further comprising:

a processor;

an input device;

a display;

a memory;

an interface for connecting said processor with said input device, said display, and said memory; and wherein said application registration mechanism, said window creation mechanism, and said menu item placement mechanism are disposed within said memory.

6. The system of claim 1, further comprising:

an input device for receiving menu item selections from a user; and a menu item dispatch mechanism configured to relate a menu item selection by said user with said predefined function specification.

7. The system of claim 3, wherein said window has a plurality of context identifiers associated therewith to form a context list and wherein said menu item placement mechanism is configured to evaluate said context identifiers of said context list in relation to said context expression in order to associate said menu item with said window.

8. The system of claim 7, wherein one of said context identifiers of said context list indicates that no generic menu items are to be placed in said window.

9. A context identification system for improving association of menu items with windows, comprising:

(a) a processor;

(b) an input device;

(c) a display;

(d) a memory;

(e) an interface for connecting said processor with said input device, said display, and said memory;

(f) a window manager in said memory, said window manager configured to drive said processor to display windows on said display and to run application programs based upon prompts from said input device, said window manager having:

(1) an application registration mechanism configured to create a menu item to be placed in a window for display, said menu item comprising a context expression, a predefined function specification defining an action to be taken by said window manager when said menu item is prompted, and a menu string defining a display image corresponding to said menu item;

(2) a window creation mechanism configured to define a window for display, said window having a context list of context identifiers; and (3) a menu item placement mechanism configured to associate said menu item with said window based upon an evaluation of said context expression associated with said menu item and said context list associated with said window.

10. The system of claim 9, wherein said context expression is a boolean equation having terms that are context identifiers.

11. The system of claim 9, wherein said context expression includes a means for indicating that said menu item is to be placed in all of said windows.

12. The system of claim 9, wherein one of said context identifiers of said context list indicates that no generic menu items are to be placed in said window.

13. The system of claim 9, further comprising a menu item dispatch mechanism configured to relate a menu item selection from said input device with said predefined function specification.

14. A computer-readable medium having a computer program, said computer program comprising:

an application registration mechanism configured to create a menu item to be placed in a window for display, said menu item comprising a context expression, a predefined function specification defining an action to be taken by said window manager when said menu item is prompted, and a menu string defining a display image corresponding to said menu item;

a window creation mechanism configured to define said window for display, said window having a context identifier; and a menu item placement mechanism configured to associate said menu item with said window based upon an evaluation of said context expression associated with said menu item and said context identifier associated with said window.

15. The medium of claim 14, wherein said context expression is a boolean equation having terms that are context identifiers.

16. The medium of claim 14, wherein said context expression includes a means for indicating that said menu item is generic and to be placed in all of said windows.

17. The medium of claim 14, wherein said context identifier indicates that no generic menu items are to be placed in said window.

18. The medium of claim 14, further comprising a menu item dispatch mechanism configured to relate a menu item selection by a user with said predefined function specification.

19. The medium of claim 14, wherein:

said window has a plurality of context identifiers associated therewith to form a context list;

said menu item placement mechanism is configured to evaluate said context identifiers of said context list in relation to said context expression in order to associate said menu item with said window; and one of said context identifiers of said context list indicates that no generic menu items are to be placed in said window.

20. A context identification method for a window manager for improving association of menu items with windows, comprising the steps of:

associating a context expression with a menu item for prompting an action;

associating a context identifier with a window for display; and determining if said menu item is to be placed in said window based upon an evaluation of said context expression and said context identifier.

* * * * *